US011430183B2

(12) United States Patent
Chiron et al.

(10) Patent No.: US 11,430,183 B2
(45) Date of Patent: Aug. 30, 2022

(54) METHOD AND SYSTEM FOR DIGITALLY MODELING AN INDUSTRIAL SPACE IN VIRTUAL REALITY

(71) Applicant: ATOS INTEGRATION, Bezons (FR)

(72) Inventors: Loïck Chiron, Clermont-Ferrand (FR); Bruce Doukhan, Teilhède (FR); Jules Royer, Clermont-Ferrand (FR); Hasan Sütyemez, Terrasson-Lavilledieu (FR)

(73) Assignee: ATOS FRANCE, Bezons (FR)

( * ) Notice: Subject to any disclaimer, the term of this patent is extended or adjusted under 35 U.S.C. 154(b) by 0 days.

(21) Appl. No.: 17/355,091

(22) Filed: Jun. 22, 2021

(65) Prior Publication Data

US 2021/0407198 A1 Dec. 30, 2021

(30) Foreign Application Priority Data

Jun. 26, 2020 (EP) .................................. 20315326

(51) Int. Cl.
*G06T 17/20* (2006.01)
*G06T 7/12* (2017.01)

(52) U.S. Cl.
CPC ............. *G06T 17/20* (2013.01); *G06T 7/12* (2017.01); *G06T 2207/20021* (2013.01); *G06T 2207/20104* (2013.01); *G06T 2210/04* (2013.01); *G06T 2210/12* (2013.01); *G06T 2210/21* (2013.01)

(58) Field of Classification Search
None
See application file for complete search history.

(56) References Cited

U.S. PATENT DOCUMENTS

| 2001/0025229 A1* | 9/2001 | Moritz | G06T 17/00 |
| | | | 703/1 |
| 2017/0084077 A1* | 3/2017 | Liu | G06T 17/20 |
| 2021/0272358 A1* | 9/2021 | Stevens | G06T 7/35 |
| 2021/0343073 A1* | 11/2021 | Carrington | G06V 20/176 |

FOREIGN PATENT DOCUMENTS

WO 2019138003 A1 7/2019

OTHER PUBLICATIONS

European Search Report issued in EP20315326, dated Nov. 4, 2020, 8 pages.
Schutz, et al, "Augmented Reality Using Range Images", Proceedings of SPIE, vol. 3012, May 15, 1997.

* cited by examiner

*Primary Examiner* — Yanna Wu
(74) *Attorney, Agent, or Firm* — ARC IP Law, PC; Joseph J. Mayo

(57) ABSTRACT

A method for digitally modeling an industrial space, the industrial space including a plurality of pieces of equipment (E3) disposed in an industrial building (B), the modeling method including a step of three-dimensionally digitizing the industrial space so as to obtain a web (NAP) defining meshes representing the outer envelope of the industrial space with all of its pieces of equipment (E3), a step of real-time segmenting the web (NAP) in a virtual environment by a user during which:
 a bounding box (F) is positioned to bound at least one piece of equipment to be segmented (E3), and
 the points of the web (NAP), belonging to the volume of the bounding box (F), are associated so as to form a virtual object (OBJ).

11 Claims, 6 Drawing Sheets

METHOD AND SYSTEM FOR DIGITALLY MODELING AN INDUSTRIAL SPACE IN VIRTUAL REALITY

BACKGROUND OF THE INVENTION

Field of the Invention

At least one embodiment of the invention relates to the field of digital modeling of an industrial space, for example, of a production line in a building.

Description of the Related Art

In a known way, a building comprises a production line for manufacturing products. The production line has many machines with a very large overall size and mass.

When a reorganization of the production line is desired, it is not contemplatable to stop the production line to test different positioning solutions for the machines. Therefore, it is known to digitally model a production line in order to test different positioning and organization solutions for the machines. The digital modeling of a production line is generally simple to implement when it is comprised of machines from a same manufacturer. Indeed, the manufacturer has a digital definition (CAD definition) of each machine that he/she can dispose as desired in a digital environment.

The task becomes more complicated when a digital definition of each machine is not available. The immediate solution is to computationally draw each machine for which the digital definition is missing. This remains time consuming and costly. To mitigate this drawback, one solution would be to draw each machine in a rough way, for example, in the form of blocks. Such a solution is not acceptable for modeling a production line with many machines because it is not possible for the user to immediately distinguish one machine from another. The digital modeling then brings only a small added value since it is far from reality and does not allow a user to intellectually apprehend advantages or disadvantages of a new organization of the production line.

Furthermore, it is difficult for a digital modeling designer to define the level of accuracy desired by the user to model each machine since the designer is not familiar with the structure or function of each machine. Indeed, a machine may be modular and comprise several independent components. Without accurate information, the designer can draw a machine as a single block when it comprises several independent modules that could be moved relative to each other. It is thereby necessary for the user to precisely define the structure of each machine, which increases modeling time and increases cost of the digital modeling.

Furthermore, it is generally desired to model an entire production space, that is, both the industrial building and machines and pieces of equipment located inside. Further to the difficulty of computationally drawing each machine and equipment, it is also necessary to draw the industrial building for which there is generally no digital definition.

One solution to eliminate these various drawbacks would be to three-dimensionally scan the production space in order to obtain a point cloud representing the production space. This solution is not satisfactory since the point cloud does not distinguish the building from machines and pieces of equipment. Such a representation is considered useless for reorganizing a production line since machines and pieces of equipment cannot be moved independently in said building.

At least one embodiment of the invention thus aims at eliminating at least some of these drawbacks by providing a new method for digitally modeling an industrial space.

Several methods for digitally modeling an industrial space by means of image processing algorithms are known in prior art from documents US2001/025229A1, "Augmented reality using range images" (Christian L. SCHUTZ, ISSN: 0277-786X) and WO 2019-138003.

BRIEF SUMMARY

At least one embodiment of the invention relates to a method for digitally modeling an industrial space, the industrial space comprising a plurality of pieces of equipment disposed in an industrial building, the modeling method comprising:
 a step of three-dimensionally digitizing the industrial space so as to obtain a web comprising a plurality of points defining meshes representing the outer envelope of the industrial space with all of its pieces of equipment,
 a step of real-time segmenting the web in a virtual environment by a user during which:
 a bounding box is positioned by the user in the virtual environment to bound at least one piece of equipment to be segmented
 the points of the web, belonging to the volume of the bounding box, are associated so as to form a virtual object.

By virtue of at least one embodiment of the invention, an end user on his/her own can segment a unitary web to define virtual objects that are representative. Such a segmentation step advantageously makes it possible not to redraw each equipment individually in detail. Furthermore, since the user defines the bounding box and its position, he/she can parameterize segmentation according to his/her choices conveniently. Segmentation in the virtual environment is most convenient for the user to determine the boundary of each equipment in a relevant manner.

Preferably, the method comprises a step of extracting the points belonging to the virtual object from the web in a database.

Preferably, the method comprises a step of selecting a plurality of virtual objects from the database in a virtual environment so as to model a new organization of the equipment in the industrial space. The database thus forms an inventory of the pieces of equipment that are specific to the industrial space. They can be positioned and duplicated as the user wishes to define a new organization of the industrial space.

According to one aspect of the invention, the bounding box is in a convex shape defining a closed volume. Preferably, the bounding box is in the form of a cylinder. A cylinder, with a rectangular, circular, or other contour, is simple for a user to define and position in a virtual environment.

Preferably, because the bounding box is defined by a closed contour and a directrix, the user draws the closed contour in the virtual environment. Advantageously, the user can accurately draw a closed contour on the ground surrounding the equipment he/she wishes to extract from the web. Such an implementation is fast and convenient.

Preferably, the method comprises a step of calculating scalar products between at least one point to be tested on the web and points of the bounding box in order to determine whether the point to be tested belongs to the bounding box. A scalar product calculation step allows the points of the web to be locally tested in the local reference frame of the user positioned in the virtual environment.

Preferably, the step of three-dimensionally digitizing the industrial space is performed by photogrammetry or lasergrammetry.

Preferably, the web comprising at least one boundary mesh comprising at least one object point belonging to the virtual object and at least one non-object point not belonging to the object, the method comprises a step of dividing the boundary mesh into a plurality of sub-meshes at least one of which exclusively belongs to the virtual object. Such a division step allows a virtual object to be extracted, with a sharp contour that both depends on the bounding box and the density of the points in the web. The extracted virtual object has an improved appearance.

Preferably, the sub-meshes are defined from points of intersection of the boundary mesh with the bounding box.

Preferably, the segmentation step is implemented by a user equipped with at least one virtual reality headset in order to be able to view the web of the industrial space and at least one control member so as to allow moving in the virtual environment and positioning the bounding box.

At least one embodiment of the invention also relates to a system for digitally modeling an industrial space, the industrial space comprising a plurality of pieces of equipment disposed in an industrial building, the modeling system comprising:
- a system for three-dimensionally digitizing the industrial space so as to obtain a web comprising a plurality of points defining meshes representing the outer envelope of the industrial space with all its pieces of equipment,
- a system for real-time segmenting the web in a virtual environment by a user, the segmentation system being configured to:
  allow the user to position a bounding box in the virtual environment to bound at least one piece of equipment to be segmented
  associate the points of the web, belonging to the volume of the bounding box, so as to form a virtual object.

BRIEF DESCRIPTION OF THE DRAWINGS

Embodiments of the invention will be better understood upon reading the following description, which is given by way of example, with reference to the following figures, which are given as non-limiting examples, in which identical references are given to similar objects.

It should be noted that the figures set out embodiments of the invention in detail to implement the embodiments of the invention, said figures of course being able to be used to better define embodiments of the invention if necessary.

DETAILED DESCRIPTION OF THE INVENTION

Figure 1:
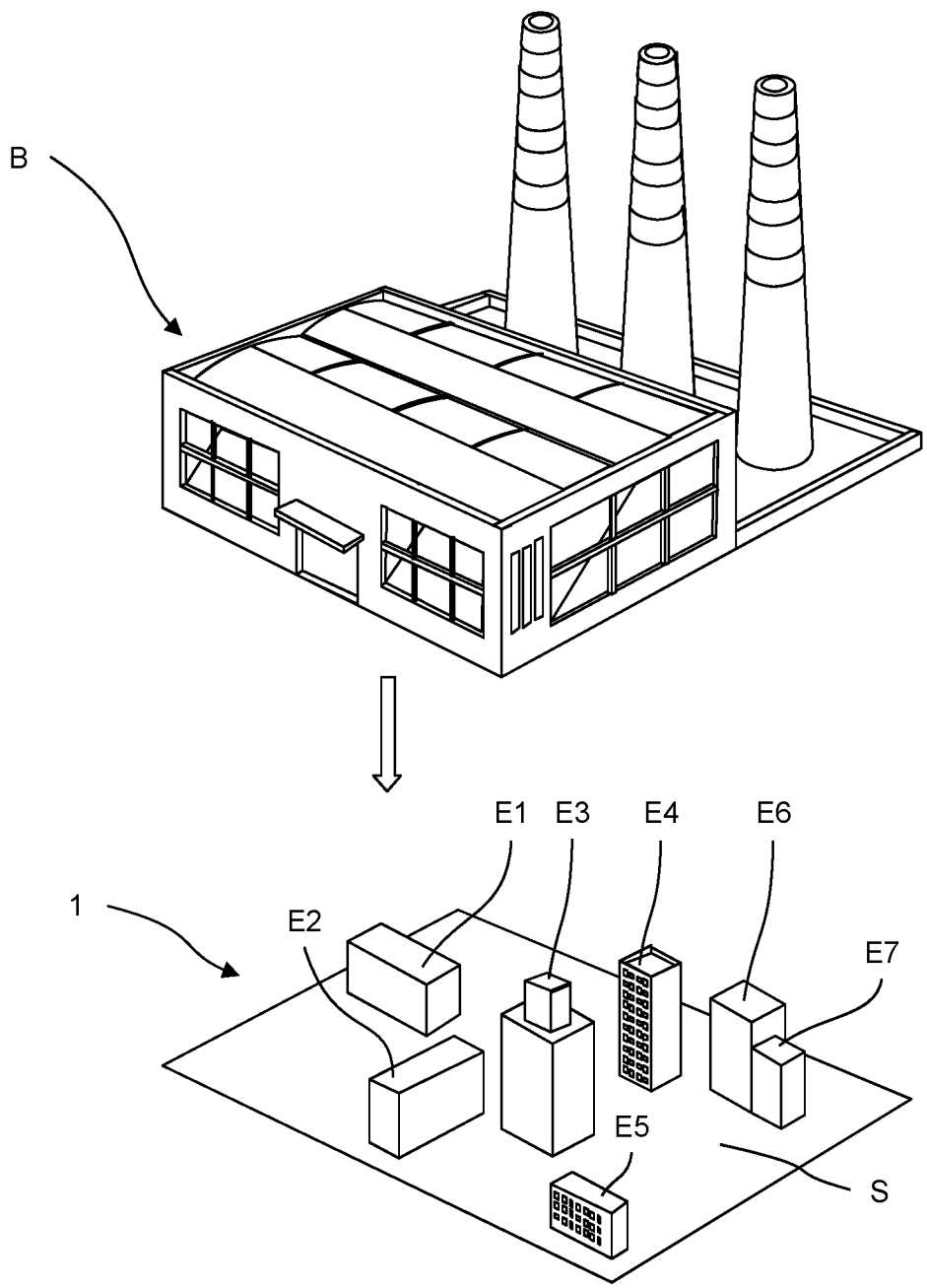
FIG. 1 is a schematic representation of a building comprising an industrial space having a plurality of pieces of equipment disposed on the ground.

With reference to FIG. 1, an embodiment of the invention relates to a method of computer-aided digital modeling of an industrial space 1 of a building B, in particular, of a production line.

The industrial space 1 comprises a plurality of pieces of equipment E1-E7 disposed in an industrial building B. As illustrated in FIG. 1, there are schematically represented 7 pieces of equipment E1-E7 that are positioned on the ground S in the industrial building B.

In this example, some pieces of equipment E1-E5 are positioned independently while others are adjoined (pieces of equipment E6-E7). In this example, for the sake of clarity and brevity, the pieces of equipment E1-E7 are represented as blocks, but in practice they have different and complex shapes, which makes their digital modeling with CAD software time-consuming and costly.

According to at least one embodiment of the invention, the modeling method comprises a step of three-dimensionally digitizing the industrial space 1 so as to obtain a web NAP comprising a plurality of points defining meshes representing the outer envelope of the industrial space 1 with all its pieces of equipment E1-E7.

Figure 2:
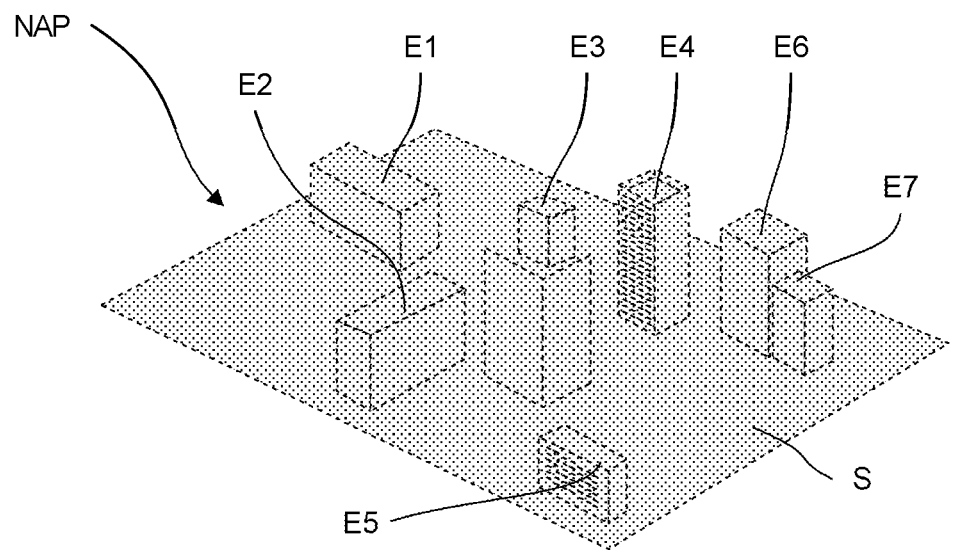
FIG. 2 is a schematic representation of a web of points defining the industrial space.

A three-dimensional digitizing step by a three-dimensional digitizing system is known to those skilled in the art. It can be implemented especially by a method of photogrammetry or lasergrammetry (laser remote sensing), known to those skilled in the art under its designation Lidar. By virtue of this step, a web NAP representing the industrial space 1 with all its pieces of equipment E1-E7 is obtained. As illustrated in FIG. 2, the pieces of equipment E1-E7 are represented as a cloud of meshed points. Such a web NAP does not allow the pieces of equipment E1-E7 to be distinguished from each other or the pieces of equipment E1-E7 with the ground S.

The web NAP comprises points that are connected in such a way as to form triangular meshes.

At least one embodiment of the invention is remarkable in that it comprises a step of real-time segmenting the web NAP in a virtual environment by a user, in particular, by the end user who desires to model the industrial space from virtual objects.

It is not very relevant to entrust the segmentation of an industrial space 1 to an external third party who does not know the nature and function of the pieces of equipment E1-E7, which lengthens the duration and increases the cost of digital modeling. At least one embodiment of the invention intends to give the end user the possibility of segmenting the web NAP by himself/herself in order to obtain the desired granularity to digitally model the industrial space 1. As it will be set forth hereafter, he/she can choose to define a virtual object corresponding to a single equipment, to a plurality of pieces of equipment associated together or to only part of a piece of equipment. The freedom offered is total and the end user does not require any external assistance.

This segmentation step is carried out in a virtual environment by means of a segmentation system 2 (FIG. 3) which comprises a virtual reality headset 20 and a control member 21 connected to a calculator 22 in which the web NAP of the industrial space 1 is stored.

Figure 3:
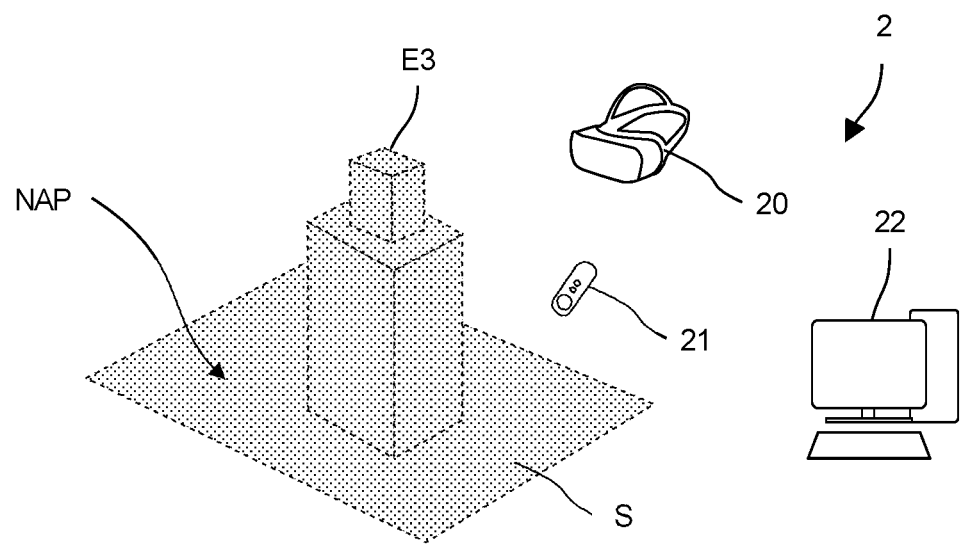
FIG. 3 is a schematic representation of a user in a virtual environment in which the web of points comprising a piece of equipment is displayed.

Still referring to FIG. 3, the user (not shown) is equipped with the virtual reality headset 20 in order to be able to view the web NAP of the industrial space 1 and with the control member 21 so as to allow moving in the virtual environment according to different positions, different angles and different magnifications with respect to said web NAP. The control member 21 further allows the segmentation to be performed as it will be performed later. The segmentation is performed in real-time in the virtual environment.

An example of segmenting the equipment E3 to extract it from the web NAP will be set forth with reference to FIGS. 3 to 6.

Figure 4:
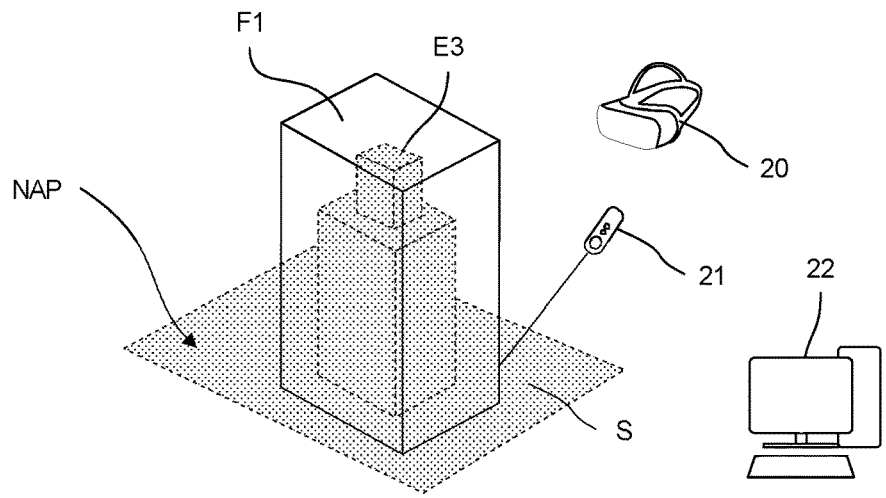
FIG. 4 is a schematic representation of a first embodiment of a bounding box for the equipment of FIG. 3.

During the segmentation step, with reference to FIG. 4, a bounding box F1 is positioned by the user in the virtual environment to bound at least one piece of equipment to be segmented, in this example, the equipment E3. By bounding box, it is meant a convex shape defining a closed volume.

The bounding box F1 defines a volume to be tested in which the equipment to be segmented is located. Advantageously, in the virtual environment, the user can accurately position and size the bounding box F1 so that it approximates the volume of the equipment to be segmented. Segmentation in the virtual environment is thus relevant.

As illustrated in FIG. 4, the bounding box F1 is in the form of a block the envelope of which is positioned to bound the points of the web NAP belonging to the equipment E3 that the user desires to segment.

Advantageously, the user has a user interface, accessible via his/her control member 21 and his/her virtual reality headset 21, so as to choose the most adapted bounding box from a set of bounding boxes (tile, sphere, ogive, capsule, etc.). Preferably, the bounding boxes that can be chosen are diverse and adapted to the technical field of the industrial space 1 to be modeled. For the sake of clarity and brevity, a bounding box will be generally referred to as F.

Advantageously, the user can position, orient and size the bounding box F precisely in the virtual environment in order to segment the equipment the structure and function of which he/she knows in an accurate and realistic way.

Figure 5:
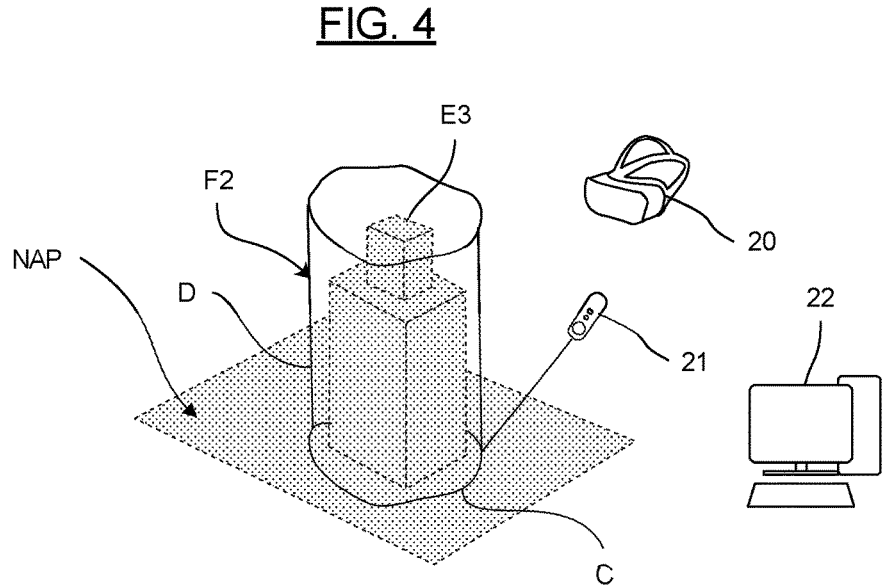
FIG. 5 is a schematic representation of a second embodiment of a bounding box for the equipment of FIG. 3.

In a preferred embodiment, with reference to FIG. 5, the bounding box F2 is in the form of a cylinder having a closed contour C and a directrix D. Preferably, the user draws in the virtual environment, using his/her virtual reality headset 20 and the control member 21, a closed contour C on the ground S that substantially intimately follows the shape of the equipment to be segmented. The user then defines a generally vertical directrix D, as well as a length of directrix D to define the bounding box F2. Such a closed contour C is precisely made and allows for relevant segmentation.

Figure 6:
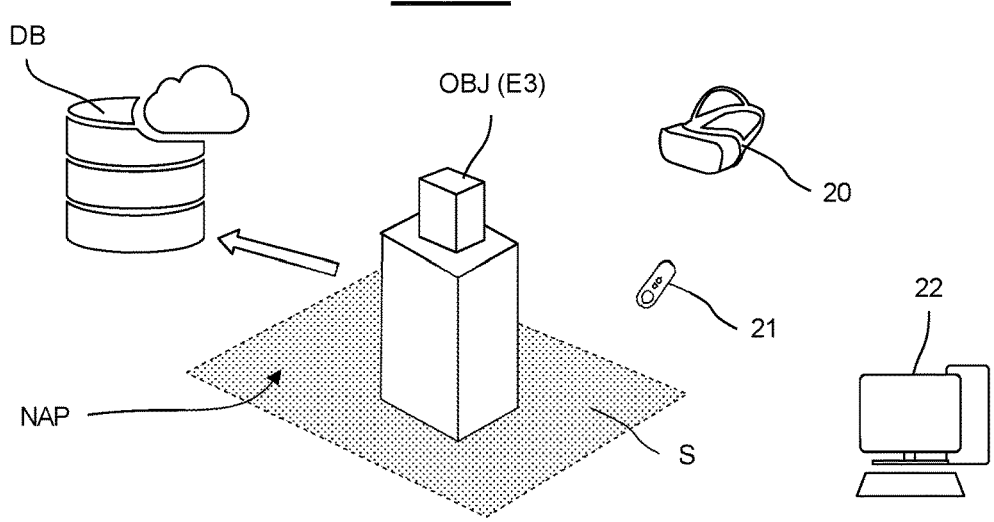
FIG. 6 is a schematic representation of a determination of a virtual object from the bounding box for the equipment of FIG. 3.

Once the bounding box F is defined (tile, cylindrical or other), the points of the web NAP, belonging to the volume of the bounding box F, are associated in order to form a virtual object OBJ. The virtual object OBJ can then be referenced in a database DB as illustrated in FIG. 6 so that it can be positioned/duplicated in another virtual test environment or in the same virtual environment. In this example, the user associates the virtual object OBJ with at least one piece of metadata, for example, an "E3 equipment" name. The database DB is preferably stored on the calculator 22. By virtue of the bounding box F, a virtual object OBJ having a complex shape perfectly representative of the equipment E3 can advantageously be obtained.

Several methods can be implemented to determine the points of the web NAP that belong to the volume of the bounding box F. A first method aims at comparing the three-dimensional position of each point P of the web NAP to the volume of the bounding box F. Such a method is efficient but requires a significant computing power.

Preferably, the web NAP and the bounding box F each have a transformation matrix. This matrix allows the conversion of meshes from the associated local reference frame to the overall reference frame of the environment. Its purpose is to be able to compare meshes of the web NAP with meshes of the bounding box F.

Figure 7:
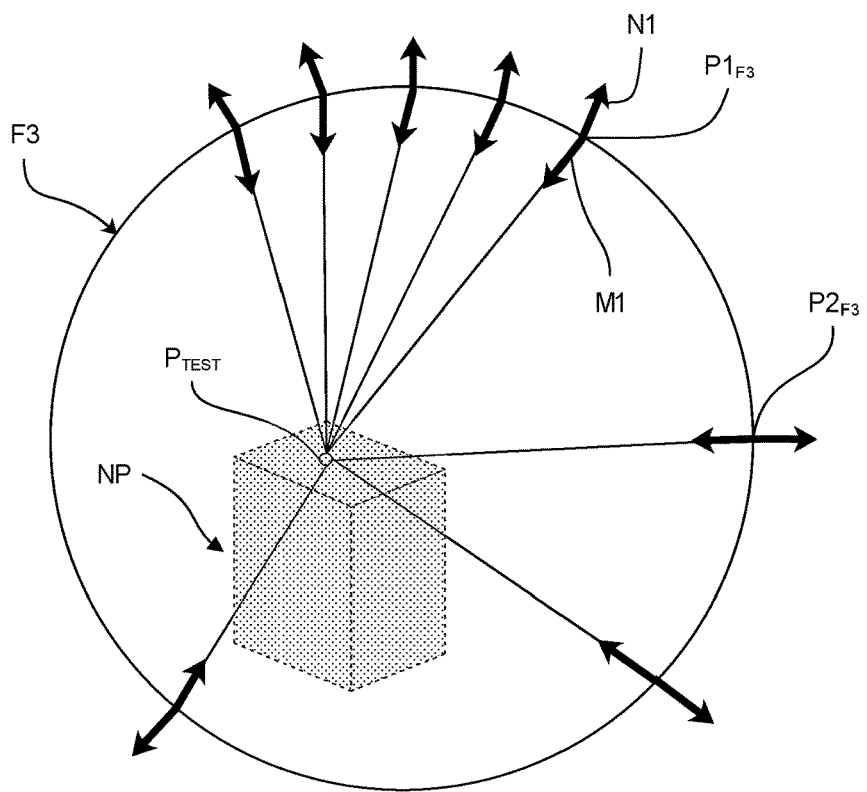
FIG. 7 is a schematic representation of a step of determining whether a point on the web belongs to the bounding box.

Alternatively, it is provided to test the points of the point cloud in a local frame of reference, in particular, the one in which the user moves in the virtual environment. To this end, a step of calculating scalar products between the points to be tested $P_{TEST}$ of the web NAP and points $P1_{F3}$, $P2_{F3}$ of a bounding box F3 is performed. In this example, with reference to FIG. 7, a bounding box F3 is represented as a sphere, but of course it could be different.

To check whether a point $P_{TEST}$ of the web NAP belongs to the bounding box F3, a normal vector N1 is defined from a first point $P1_{F3}$ of the bounding box F3 and a direction vector M1 starting from said first point $P1_{F3}$ of the bounding box F3 towards the point to be tested $P_{TEST}$ of the web NAP. A scalar product is made between the normal vector N1 and the direction vector M1 which has preferably been previously normalized.

If the scalar product is negative, the point to be tested $P_{TEST}$ belongs to the bounding box F3 and is associated with the virtual object OBJ. Conversely, if the scalar product is zero or positive, the point to be tested $P_{TEST}$ is excluded from the virtual object. This method by scalar calculation is faster and does not require a change of frame of reference which is computationally expensive. The determination of a virtual object OBJ can be conveniently and quickly performed in real-time by a user locally moving in a virtual environment.

Preferably, during the segmentation step, the points belonging to the virtual object OBJ are extracted from the web NAP in order to define a new purified web. In practice, the user can thus extract all the pieces of equipment in order to obtain a web NAP representing the industrial building B, in particular, its ground S.

Figure 8:
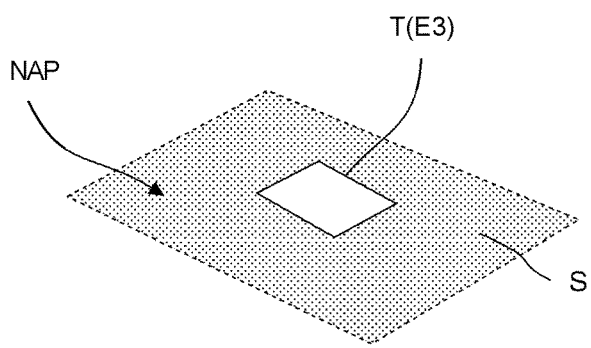
FIG. 8 is a representation of the schematic web following extraction of the virtual object.
Figure 9:
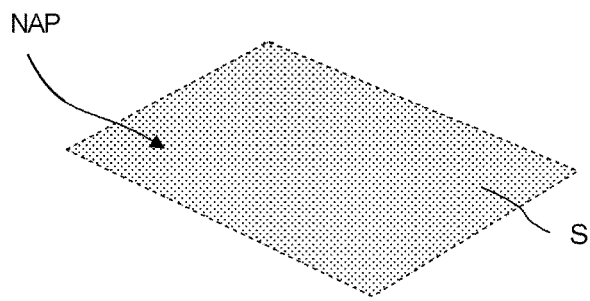
FIG. 9 is a representation of the web following a remeshing step.

As illustrated in FIG. 8, after extraction of the virtual object OBJ corresponding to the equipment E3, the web NAP has a hole T. In order to form a continuous web NAP, a new meshing is preferably made from the unextracted points as illustrated in FIG. 9.

In order to allow an accurate clean extraction of the virtual object OBJ, a step of dividing the boundary meshes of the virtual object OBJ is conducted.

Figure 10:
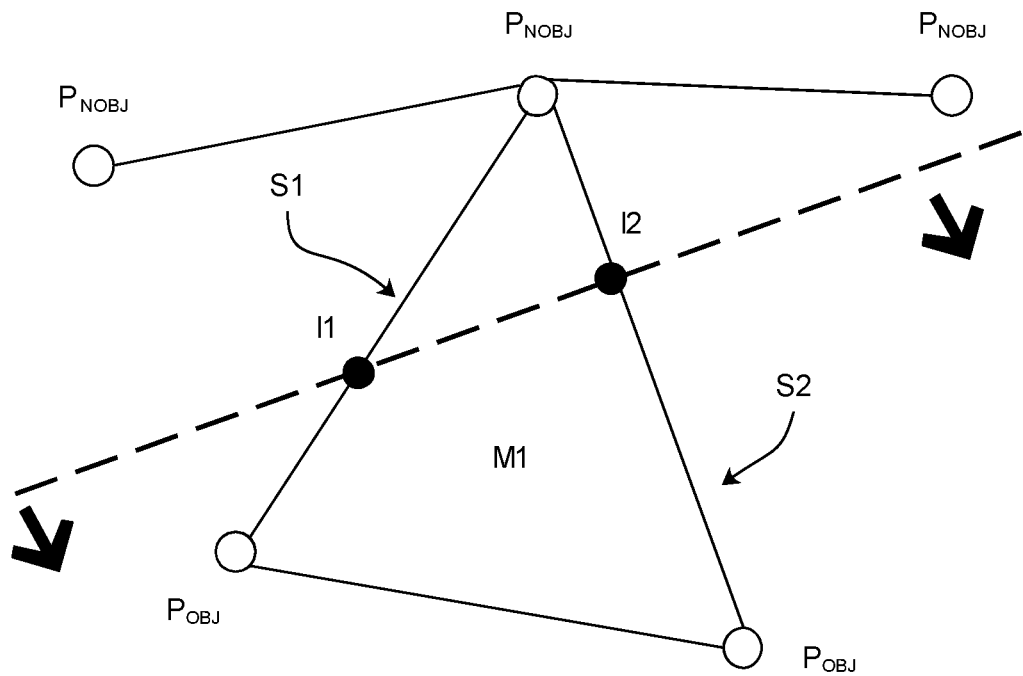
FIG. 10 is a close-up schematic representation of a boundary mesh of the web for a predetermined bounding box.

With reference to FIG. 10, upon extracting the points of the virtual object OBJ, some meshes M1, called boundary meshes M1, comprise at least one object point $P_{OBJ}$ (a vertex) belonging to the virtual object OBJ and at least one non-object point (vertex) $P_{NOBJ}$ not belonging to the object OBJ. Each boundary mesh M1 thus comprises at least one connection segment S1, S2 connecting an object point $P_{OBJ}$ and a non-object point $P_{NOBJ}$. As illustrated in FIG. 10, the bounding box F cuts the bounding mesh M1 in two and passes through two segments S1, S2 at two points of intersection I1, I2.

Figure 11:
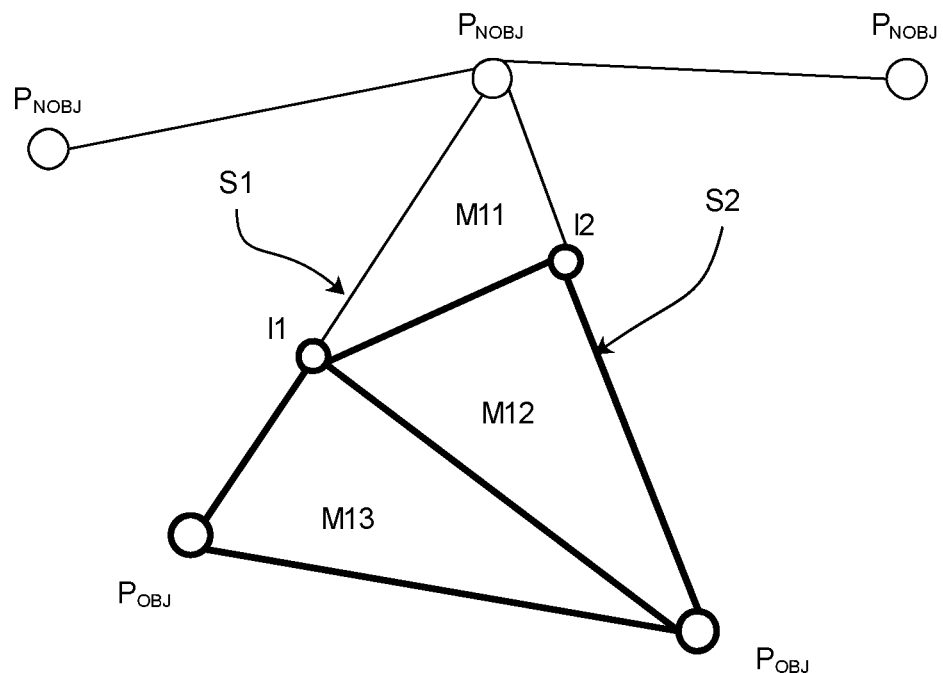
FIG. 11 is a close-up schematic representation of a division of the boundary mesh of FIG. 10 into a plurality of sub-meshes.

With reference to FIG. 11, the method comprises a step of dividing the boundary mesh M1 into a plurality of sub-meshes M11, M12, M13, at least one of which exclusively belongs to the bounding box F. In this example, two sub-meshes M12, M13 exclusively belonging to the bounding box are formed.

In this embodiment, the points of intersection I1, I2 are defined as points of the web NAP and used to remesh, in real-time, the boundary mesh L1 in order to define a plurality of new triangular meshes M11, M12, M13. As illustrated in FIG. 11, the meshes M12, M13 belong to the bounding box and are integrated into the virtual object OBJ, which will improve accuracy and sharpness of said virtual object OBJ that can thus be better apprehended by the user.

Figure 12:
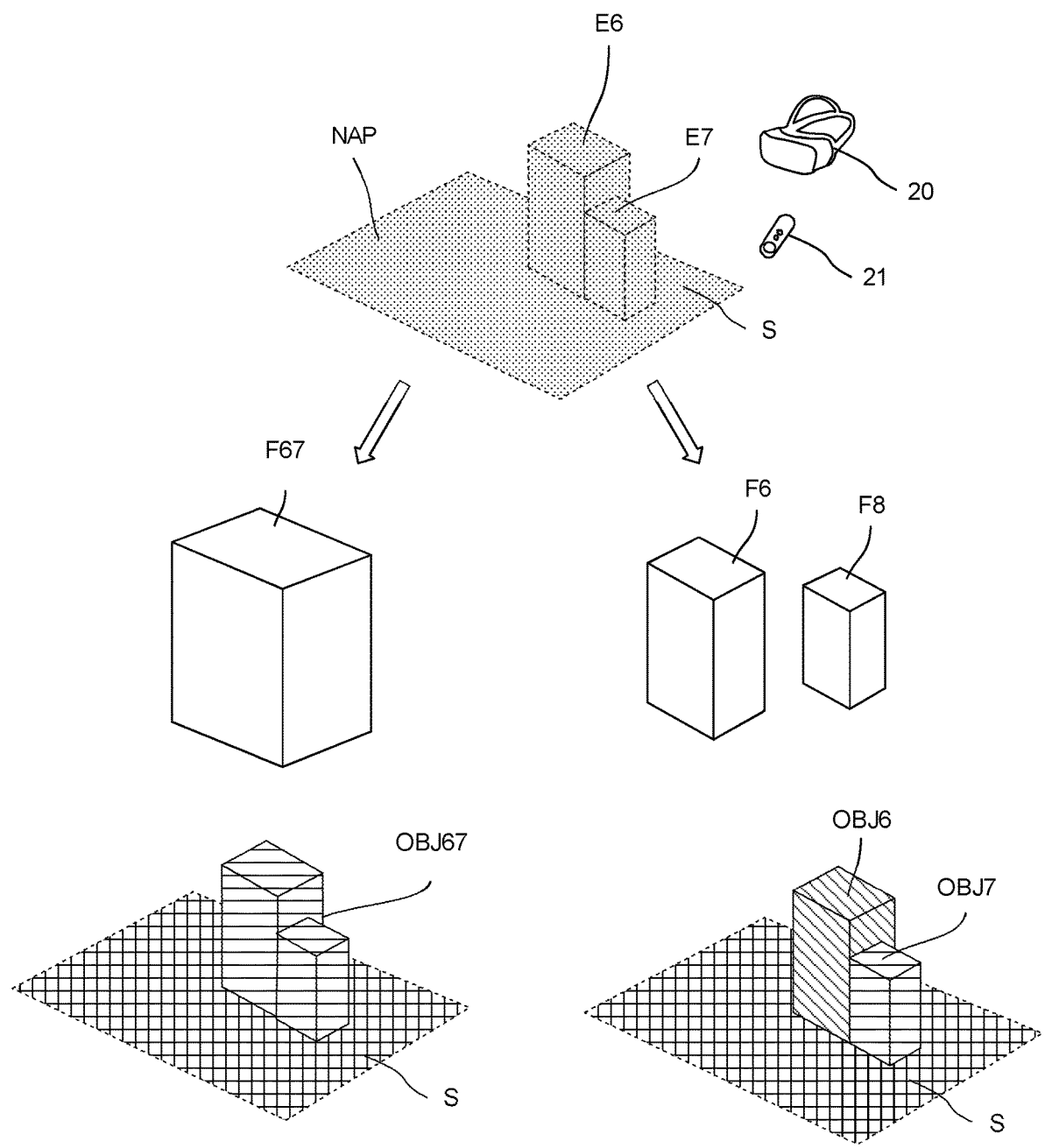
FIG. 12 is a close-up schematic representation of two different segmentations of a set of two pieces of equipment belonging to the web.

By virtue of at least one embodiment of the invention, the user can extract virtual objects OBJ from the web NAP with the granularity that he/she/she desires by choosing the most adapted bounding box F. As an example, with reference to FIG. 12 representing the web NAP integrating two pieces of equipment E6-E7 which are adjoined. The user can define a single bounding box F67 to define a single virtual object OBJ67 or two bounding boxes F6, F7 to define two virtual objects OBJ6, OBJ7 that are distinct from each other. Advantageously, a user can form a virtual object comprising several independent pieces of equipment that are always associated together, which provides significant time saving.

By virtue of at least one embodiment of the invention, the database DB forms a library for the user in which all the virtual objects OBJ that he/she desires to reorganize in the industrial space 1 are listed. Each virtual object OBJ has its exact shape without having been redrawn by a computer, which saves time and improves perception of the virtual objects in comparison with objects that would have been roughly drawn.

Advantageously, the segmentation system 2 also allows the user to place virtual objects OBJ according to the position of his/her choice in order to be able to imagine the industrial space 2 corresponding to his/her constraints and desires. The same virtual object OBJ can be reused several times from the library thus obtained.

The invention claimed is:

1. A method for digitally modeling an industrial space, the industrial space comprising a plurality of pieces of equipment disposed in an industrial building, the method comprising:
   three-dimensionally digitizing the industrial space to obtain a web comprising a plurality of points defining meshes representing an outer envelope of the industrial space with said plurality of pieces of equipment; and
   real-time segmenting the web in a virtual environment with which a user interacts, comprising
      obtaining a bounding box positioned by the user in the virtual environment to bound at least one piece of equipment of said plurality of pieces of equipment, wherein said at least one piece of equipment is to be segmented; and,
      associating points of said plurality of points within the bounding box to form a virtual object, wherein said virtual object corresponds to
         all or a part of a single piece of equipment of said plurality of pieces of equipment; or
         two or more of pieces of equipment of said plurality of pieces of equipment that are associated together.

2. The method according to claim 1 further comprising extracting the points associated with the virtual object from the web in a database.

3. The method according to claim 2 further comprising selecting a plurality of virtual objects from the database in said virtual environment so as to model a new organization of the pieces of equipment of the industrial space.

4. The method according to claim 1 wherein the bounding box is in a convex shape defining a closed volume.

5. The method according to claim 1 wherein the bounding box is defined by a closed contour drawn by the user in the virtual environment; and,
   a directrix.

6. The method according to claim 1 further comprising calculating scalar products between a point to be tested of the plurality of points and the points of the plurality of points within the bounding box in order to determine whether the point to be tested belongs to the bounding box.

7. The method according to claim 1 wherein said three-dimensionally digitizing the industrial space is performed by one or both of photogrammetry and lasergrammetry.

8. The method according to claim 2 further comprising when a boundary mesh of said meshes comprises at least one object point associated with the virtual object and at least one non-object point not associated with the virtual object, dividing the boundary mesh into a plurality of sub-meshes at least one of which comprises said at least one object point and does not comprise said at least one non-object point.

9. The method according to claim 8 wherein the plurality of sub-meshes are defined from points of intersection of the boundary mesh with the bounding box.

10. The method according to claim 1 wherein said real-time segmenting the web further comprises
   displaying a view of the web of the industrial space in at least one virtual reality headset used by said user; and,
   obtaining input from at least one control member used by said user to move in the virtual environment and to position the bounding box.

11. A system for digitally modeling an industrial space, the industrial space comprising a plurality of pieces of equipment disposed in an industrial building, the system comprising:
   a digitization system for three-dimensionally digitizing the industrial space to obtain a web comprising a plurality of points defining meshes representing an outer envelope of the industrial space with said plurality of pieces of equipment; and
   a segmentation system for real-time segmenting the web in a virtual environment with which a user interacts, wherein the segmentation system is configured to
      obtain a bounding box positioned by the user in the virtual environment to bound at least one piece of equipment of said plurality of pieces of equipment, wherein said at least one piece of equipment is to be segmented; and,
      associate points of said plurality of points within the bounding box to form a virtual object, wherein said virtual object corresponds to
         all or a part of a single piece of equipment of said plurality of pieces of equipment; or
         two or more of pieces of equipment of said plurality of pieces of equipment that are associated together.

* * * * *